United States Patent
Tuason, Jr. et al.

(10) Patent No.: US 6,689,405 B1
(45) Date of Patent: Feb. 10, 2004

(54) FAT-LIKE AGENTS FOR LOW CALORIE FOOD COMPOSITIONS

(75) Inventors: Domingo C. Tuason, Jr., Bensalem, PA (US); Thomas A. Ruszkay, Mt. Laurel, NJ (US); Sydney Heese, Haddonfield, NJ (US)

(73) Assignee: FMC Corporation, Philadelphia, PA (US)

( * ) Notice: Subject to any disclaimer, the term of this patent is extended or adjusted under 35 U.S.C. 154(b) by 1,826 days.

(21) Appl. No.: 08/379,803

(22) Filed: Jan. 27, 1995

Related U.S. Application Data

(63) Continuation of application No. 08/097,814, filed on Jul. 26, 1993, now abandoned.

(51) Int. Cl.[7] .................................................. A23L 1/36
(52) U.S. Cl. ......................... 426/93; 426/573; 426/804
(58) Field of Search .......................... 426/96, 573, 804

(56) References Cited

U.S. PATENT DOCUMENTS

| | | | | |
|---|---|---|---|---|
| 4,341,807 A | | 7/1982 | Turbak et al. ............... | 426/570 |
| 4,374,702 A | | 2/1983 | Turbak et al. ............... | 162/100 |
| 4,378,381 A | | 3/1983 | Turbak et al. ............... | 426/570 |
| 4,452,721 A | | 6/1984 | Turbak et al. ............... | 252/310 |
| 4,452,722 A | | 6/1984 | Turbak et al. ............... | 252/311 |
| 4,483,743 A | | 11/1984 | Turbak et al. ............... | 162/100 |
| 5,011,701 A | | 4/1991 | Baer et al. ................... | 426/573 |
| 5,192,569 A | | 3/1993 | Mc Ginley et al. ........... | 426/96 |
| 5,356,644 A | * | 10/1994 | Hendrick et al. .............. | 426/99 |
| 5,366,742 A | * | 11/1994 | Tuason, Jr. et al. ........... | 426/96 |
| 5,441,753 A | * | 8/1995 | McGinley et al. ............. | 426/56 |
| 5,462,761 A | * | 10/1995 | McGinley et al. ........... | 426/573 |
| 5,464,645 A | * | 11/1995 | Wesdorp et al. ............. | 426/573 |
| 5,476,678 A | * | 12/1995 | Walter et al. ................ | 426/660 |
| 5,490,997 A | * | 2/1996 | Devine et al. ............... | 426/573 |
| 5,536,514 A | * | 7/1996 | Bishay et al. ................ | 426/103 |
| 5,538,751 A | * | 7/1996 | Carter et al. ................. | 426/661 |

OTHER PUBLICATIONS

M. Eagleson, Concise Encyclopedia Chemistry, Walter de Gruder, New York, 1993, p. 437.*
O. A. Battista, "Microcrystalline Polymer Science", pp. 39, 40; McGraw–Hill, (1975).
FMC Corporation, Bulletin L–9786 AAPS (1986).
FMC Corporation, Bulletin G–34 (1985).

* cited by examiner

*Primary Examiner*—Curtis E. Sherrer
(74) *Attorney, Agent, or Firm*—FMC Corporation

(57) ABSTRACT

A composition suitable for use as a fat-like substitute in low-calorie, aqueous-based foodstuffs comprising dry, water-dispersible particles, said particles consisting of an agglomerate of microreticulated or microfibrillated microcrystalline cellulose in a predominant amount by weight, and a hydrocolloid selected from a carboxymethylcellulose and xanthan gum in an amount sufficient to provide effective coverage of the cellulose.

13 Claims, No Drawings

FAT-LIKE AGENTS FOR LOW CALORIE FOOD COMPOSITIONS

This application is a continuation, of application Ser. No. 08/097,814, filed Jul. 26, 1993 now abandoned.

BACKGROUND OF THE INVENTION

This invention relates to an improved form of non-nutritive, fat-like agents for use in the preparation of low-calorie food compositions. More particularly, this invention relates to dry, microreticulated or microfibrillated microcrystalline cellulose compositions which are readily dispersible in water for use as fat-like substitutes in the preparation of aqueous-based low-calorie foodstuffs. Still more particularly, this invention relates to compositions consisting essentially of agglomerates of microreticulated or microfibrillated cellulose and the hydrocolloids xanthan gum or a carboxymethylcellulose in a dry, particulate form. The resulting composition provides a fat-like consistency, appearance, and mouthfeel when reconstituted as a component in aqueous-based low calorie foods, particularly such foods as salad dressings, dairy products such as frozen desserts, and the like.

By the term "agglomerate", as used herein, is meant a stable, substantially physical mixture of at least two components in its wet or dry state whose components are loosely bound to each other when dried, but disperse into its component parts when reconstituted in water under typical food processing conditions. This physical state is to be distinguished over "aggregates", which are firmly bound components in particle form which remain bonded to each other even if reconstituted in water under typical food processing conditions.

The use of fat-like substitutes in the preparation of low-calorie food compositions is now generally well-established in the art. See, for example, U.S. Pat. No. 5,192,569 (McGinley, et al.), as well as those set forth in the background description of U.S. Pat. No. 5,011,701 (Baer et al.).

More particularly, in that latter patent, i.e. U.S. Pat. No. 5,011,701, there is described a fat substitute material comprising a microreticulated form of microcrystalline cellulose and xanthan gum. As described therein, the term microreticulated microcrystalline cellulose (MRC) defines a highly sheared form of known microcrystalline cellulose (MCC) obtained by shearing an aqueous dispersion of about 3–10 wt. % of MCC under certain defined conditions, reagglomerating the resulting fragments under further high shear conditions to obtain an aqueous dispersion of MRC particles having a void volume of about 25 percent, and a particle size of from about 5–20 microns having a given particle size distribution.

To this aqueous, agglomerated MRC dispersion, according to the description in U.S. Pat. No. 5,011,701, may thereafter be separately added, along with other components, xanthan gum to stabilize the resulting aqueous dispersion which is then directly blended with selected food components to prepare a low fat or fat-free foodstuff.

The aqueous MRC composition which is mixed with xanthan gum and food components, while effective for the purpose intended in preparing low-calorie foodstuffs, nevertheless does not have substantial economic usefulness and flexibility in commerce in view of the need to admix it directly with the food components in the form of its aqueous dispersion as it is made, rather than in a redispersible dry form. That is to say, as will be shown in Example 4 below, attempts to dry the aqueous MRC dispersion by conventional means results in aggregates of material which cannot satisfactorily be redispersed in an aqueous medium for further mixture with food components.

SUMMARY OF THE INVENTION

In accordance with the present invention there is now provided an improved food additive composition comprising dry, readily water-dispersible, agglomerates in particulate form, said particles consisting essentially of microreticulated microcrystalline cellulose (MRC) or microfibrillated microcrystalline cellulose (MFC) in a predominant amount by weight and a hydrocolloid selected from xanthan gum and a carboxymethylcellulose (CMC), the hydrocolloid being present in amounts sufficient to provide effective coverage of the MRC or MFC. The invention is directed also to methods of preparing low-calorie food compositions containing the aforesaid compositions, as well as to the food compositions themselves.

DETAILED DESCRIPTION OF THE INVENTION

The microcrystalline cellulose employed in the preparation of the MRC starting material of this invention should desirably but not necessarily be of colloidal size, i.e., it may have an average particle size of about 0.1–100 microns, depending upon how the MCC is prepared, and preferably a particle size distribution such that not more than about 10–40% of the particles are over about 0.2–0.5 micron size. Particles of this size and distribution are obtained by conventional means, as for example by hydrolysis of the cellulose pulp, followed by wet mechanical disintegration.

The extraction and processing of microcrystalline cellulose from wood pulp or fiber is well known in the art as described, for example, in U.S. Pat. Nos. 3,539,365 and 4,263,334 (above). For purposes of this process, the MCC can be in the form of a mechanically disintegrated aqueous slurry or wetcake having a solids content ranging from about 5 to 45% by weight, depending upon whether a high solids attrition is employed, e.g. about 30–45% solids, or a low solids, i.e. wet solids milling process (e.g. about 5–10% solids) known to the art is employed. See, for example, O. A. Battista, "Microcrystalline Polymer Science", pp. 39, 40, McGraw-Hill Book Co., (1975), and U.S. Pat. No. 2,978,446. The preparation of MCC is also described in FMC Corporation Bulletins L-0786 AAPS (1986) and G-34 (1985). As described therein, microcrystalline cellulose wetcake obtained from wood pulp which has been hydrolyzed with acid in a known manner may be simply spray-dried to produce a non-colloidal, powered grade of cellulose (Avicel "PH" grade Cellulose, e.g., PH 101) or mechanically disintegrated to form a colloidal grade of cellulose (Avicel "RC/CL" grade cellulose, both available from FMC Corporation, Philadelphia, Pa.). Depending upon how the cellulose wetcake is treated, if at all, the particle size of these various grades may range from about 0.1 to about 10 microns for the colloidal grade, and from about 10 to 100 microns for the non-colloidal grades. It will be understood that these ranges, which may overlap somewhat, will determine the size of the resulting MCC.

The microreticulated form of microcrystalline cellulose employed herein may then be prepared from MCC in accordance with the examples below, as well as by the high shear methods described in U.S. Pat. No. 5,011,701 (above), which, again, is incorporated by reference, particularly the description in columns 5 and 6 thereof.

Alternatively there may be employed as the microcrystalline cellulose component of the composition claimed herein the microfibrillated microcrystalline cellulose (MFC) of U.S. Pat. No. 4,378,381 (Turbak et al.), or related patents, U.S. Pat. No. 4,374,702; U.S. Pat. No. 4,483,7343; or U.S. Pat. No. 4,452,721, all of which are incorporated herein by reference, and which describe a fibrillated cellulose which is also prepared from microcrystalline cellulose. This cellulose, (MFC), which is defined as having increased surface area, greater liquid absorption characteristics, and greater reactivity, is prepared, according to these patents, by passing a liquid suspension of fibrous cellulose through a small diameter orifice in which the suspension is subjected to a pressure drop of at least 3000 psi and a high velocity shearing action followed by a high velocity decelerating impact and repeating the passage of said suspension through the orifice until the cellulose suspension becomes a substantially stable suspension. The process converts the cellulose into microfibrillated cellulose without substantial chemical change. The resulting MFC is characterized in having a water retention value of over 280%, a settling volume after 60 minutes in a 0.5% by weight suspension in water of greater than 60% and a rate of degradation increase by hydrolysis at 60° C. in one molar hydrochloric acid at least twice as great as cellulose beaten to a Canadian Standard Freeness value of 50.

The resulting MFC, in aqueous suspension form, may then be used in this invention in place of, or in addition to, the microreticulated cellulose described above in U.S. Pat. No. 5,011,701.

Thus, as used hereinafter throughout this description, the term "microreticulated crystalline cellulose" shall also be understood to include the aforesaid "microfibrillated microcrystalline cellulose" in the novel compositions of this invention.

Following the conversion of the MCC to its MRC form, which is porous, the hydrocolloid, which must be xanthan gum or CMC since not all hydrocolloids are effective for this purpose, is then added to the aqueous dispersion in amounts sufficient to effectively penetrate the reagglomerated cellulose pores, and thus coat the individual cellulose particles by adsorption. Alternatively, the hydrocolloid may be added to the MCC prior to its conversion to the MRC form; this is conveniently achieved by hydrating the xanthan gum to form an aqueous solution which may then be admixed vigorously with the MCC. In either case, it is essential that the two materials be admixed to form hydrocolloid-coated particles of MRC (or MFC) before the composition is dried. By the term "effectively coat", as used above, is meant coating the MRC sufficiently to permit its ready redispersion in water, for example under aqueous food-mixing conditions, in contrast to an inadequate coating which would allow the cellulose to become irreversibly aggregated.

The mixing of these two components may be accomplished by the use of high shear equipment such as Waring blenders, colloid mills, homogenizers, and the like. The solids content of this mixture is not critical and may be varied routinely, depending upon the consistency needed for the subsequent drying step. In a typical procedure, the mixing is carried out until the desired size agglomerate of the two components is obtained in the form of a slurry, generally at room temperature. Following this the slurry may, if necessary, be further sheared, as for example in a homogenizer, to obtain a uniform and homogeneous distribution of the components, just prior to the drying step.

The resulting mixture must then be co-dried by spray drying, to form the composition of this invention, namely an agglomerate in powder form whose particles are readily dispersible in water. As used herein, the term "dry" includes powdered agglomerate which may contain up to a few percent of water which has been absorbed by the cellulose and/or hydrocolloid.

Because the MRC comprises a predominant amount by weight of the resulting composition, the weight ratio of hydrocolloid to MRC should desirably be about 0.08–0.33:1.0, and preferably about 0.14–0.18:1.0, although these ratios are not critical.

The effectiveness of the redispersibility of the composition of this invention under the high shear conditions of food processing, for example, can be seen from the viscosity properties of the aqueous dispersion prepared from the powdered product obtained by the spray-drying. That is to say, the viscosity of the rehydrated powder of this invention is about the same as the viscosity of the slurry before spray-drying. Thus, while the viscosity of any given preparation will depend upon the nature of its ingredients, that viscosity is, surprisingly, maintained both before and after spray-drying.

The particle size of the MRC or MFC in the resulting dispersion should be desirably be in the range of from about 10 to 40 microns, and preferably about 3 to 15 microns, particularly if it is to be used as a fat-like substitute. In order to assure this particle size distribution, spray drying conditions may be regulated in a known manner, i.e. conditions which influence particle size and size distribution, including the method of atomization (nozzle, centrifugal types), rate of atomization (wheel speed, nozzle size, nozzle atomizing air pressure and the like), and slurry properties such as viscosity and its related solids content. For instance, the more dilute the slurry the smaller the resulting particle size and the narrower the particle size distribution. Those skilled in the art will also recognize that by varying the particle size distribution, in particular by adjusting the nozzle size, and/or the pressure at which the homogenized slurry to be dried is pumped through the nozzle, the desired particle size will be obtained. The operating temperatures can be regulated by selecting optimal operating inlet and outlet temperatures. It will be recognized that these temperatures are not critical and can be varied substantially depending upon the properties of the slurry to be dried.

The compositions of this invention are readily incorporated in the desired foodstuffs, such as salad dressings or dairy products, by various means. In general, it is preferred to disperse the particulate composition in water to form an aqueous dispersion, which is then processed with the foodstuffs by conventional food processing, i.e., mixing, means.

The amount of the aqueous MRC-hydrocolloid-containing dispersion which may be incorporated in a given foodstuff is not critical and can be varied considerably. Generally, the amount of dispersion employed should be sufficient to provide the foodstuff with the desired fat-like characteristics, including mouthfeel, bulk, consistency and the like. Thus, foodstuffs may contain as little as about 0.5% of the agglomerate solids content, based on the total weight of the food composition, or as much as about 5%, and desirably about 1–3%. For example, salad dressings may desirably contain in from about 1.5 to 3% of agglomerate in the final formulation, while dairy products such as frozen desserts may contain from about 0.5 to 2.0% of the agglomerate.

Other foodstuffs which may advantageously be improved by this invention include candies, frostings, gravies, margarines, mayonnaise, meat and vegetable fillings, puddings, sauces, soups, spreads, and like water-based foods.

The invention will now be illustrated by, but is not intended to be limited to, the following examples. In these examples it will be noted that Examples 4 and 7 are comparative examples. Thus, in Example 4, MRC was dried without any xanthan gum or CMC, with the result that the dried material would not satisfactorily redisperse to form the desired pore size MRC. Example 7 illustrates that use of other coating agents than xanthan gum or CMC, e.g. Na caseinate, results in a similarly unsatisfactory MRC product.

EXAMPLE 1

Preparation and Co-drying of a Mixture of 88% Microreticulated (MRC) Microcrystalline Cellulose and 12% Xanthan Gum Hydrolyzed microcrystalline cellulose (MCC) wetcake derived from fibrous cellulose wood pulp, 1047.6 grams, (solid content 42%) was slurried using an overhead Caframo mixer for 15 minutes in 5238.1 grams of distilled water, giving a slurry containing 7% solids. After this time, the slurry was heated to about 71°C. (160° F.) where it was agitated for an additional 15 minutes. The hot slurry was then passed a number of times under high pressure through a Manton Gaulin homogenizer until a stable suspension of crystalline cellulose was attained. The desired viscosity of the homogenized MRC gel was obtained in preferably three to five passes at pressures of about 563 kg/cm$^2$ (equiv. to 8000 psi) to 845 kg/cm$^2$ (equiv. to 12,000 psi). That is to say, viscosity of the homogenized crystalline cellulose ranged from between 8,600 cps to 14,000 cps with from three to five passes at a homogenizer pressure of 563 kg/cm$^2$. The viscosity was measured at 77–82° C. using a Brookfield viscometer with a TB-bar spindle at 10 revolutions/minute and the heliopath set at one minute.

In a separate vessel, using a Caframo mixer, 65.9 grams of xanthan gum (Keltrol FXanthan gum-9% moisture content, Kelco Company, San Diego, Calif.) was hydrated in 8175.32 grams of distilled water, giving a 0.7% (wt/wt) solution. The 0.7% solution of xanthan gum was then added to the homogenized MRC gel. The mixture was agitated for an additional 15 minutes using a Gifford Wood colloid mill set at 10 mil clearance with the rotor operating at 16,000 revolutions/minute.

The resulting mixture, containing 3.4% solids, was then spray-dried in the following manner: The homogenized MRC-xanthan gum mixture was fed to a 3 foot (0.91 meter) Bowen spray dryer at a pressure of about 6.3 kg/cm$^2$ by means of a variable feed Moyno pump, at a rate to provide the proposed outlet temperature. The spray dryer utilized a nozzle atomization opening of 0.25 cm. The operating inlet/outlet air temperature of the spray dryer was about 230° C. and 125° C., respectively. The completion of the spray-drying required about 140 minutes, yielding 240 grams of a mixture of 88% (wt/wt) microreticulated MCC and 12% xanthan gum in the form of a powder. Upon reconstitution of the dried powder as a 1% (wt/wt) concentrate in water, the mixture exhibited fully dispersed submicron crystalline cellulose particles after mixing under conditions simulating typical food processing. Under the same conditions of reconstitution, the viscosity of a 3.4% concentrate of dried MRC-gum powder in water was comparable to that before the crystalline cellulose—xanthan gum mixture was spray-dried. The properties of the wet homogenized microreticulated form of the crystalline cellulose—xanthan gum agglomerate were thus retained in the spray drying and the reconstitution in water.

The resulting spray-dried powder was mixed with other ingredients as prescribed for a salad dressing formulation shown below:

| No - Oil Salad Dressing | |
|---|---|
| Ingredients | Amount (wt/wt %) |
| Water | 89.90 |
| Vinegar (white distilled, 50 grain) | 5.00 |
| 88/12 Microreticulated cellulose/xanthan gum | 2.00 |
| Starch | 3.00 |
| Xanthan gum | 0.15 |
| Salt | 2.00 |
| Dextrose | 5.50 |
| Flavors and Colorants | 1.45 |
| | 100.00 |

The no-oil salad dressing product prepared with the spray-dried 88:12 wt % MRC-xanthan gum powder with 2.0% by weight of finished dressing had a fat-like rich texture and consistency similar to those obtained from pourable oil-based dressings.

EXAMPLE 2

Preparation and Co-drying of a Mixture of 92% Microreticulated Microcrystalline Cellulose and 8% Xanthan Gum A mixture of microreticulated MCC and xanthan gum was prepared and co-dried in a manner similar to that of Example 1, to form the agglomerate of this invention, but using 1095.2 grams of hydrolyzed MCC wetcake (42% solids) , and 44.0 grams of xanthan gum (Keltrol, FXanthan gum-9% moisture content) in 10927.2 grams of distilled water (a 4.1% solids mixture), to yield, when co-dried, 230 grams of a mixture of 92% microreticulated MCC and 8% xanthan gum in the form of a powder. Under the same conditions of reconstitution as described in Example 1, the properties of the wet homogenized microreticulated form of the crystalline cellulose—xanthan gum mixture was retained in the spray-drying and the reconstitution in water.

The resulting spray dried powder, when mixed with other ingredients as prescribed for a salad dressing formulation forms the product shown below:

| No - Oil Salad Dressing | |
|---|---|
| Ingredients | Amount (wt/wt %) |
| Water | 89.40 |
| Vinegar (white distilled, 50 grain) | 5.00 |
| 92/8 Microreticulated cellulose/xanthan gum | 2.50 |
| Starch | 3.00 |
| Xanthan gum | 0.15 |
| Salt | 2.00 |
| Dextrose | 5.50 |
| Flavors and Colorants | 1.45 |
| | 100.00 |

The no-oil salad dressing product prepared with the spray-dried 92:8 wt % microreticulated MCC-xanthan gum powder with 2.5% by weight of finished dressing has a fat-like rich texture and consistency similar to those obtained from pourable oil-based dressings.

EXAMPLE 3

Pilot Plant-Scale Preparation and Co-drying of a Mixture of 88% Microreticulated Microcrystalline Cellulose and 12% Xanthan Gum Hydrolyzed (MCC) wet cake derived from fibrous cellulose wood pulp, 113 pounds, (solids content 39%) was dispersed with a propeller mixer in 62 gallons of deionized water, giving a slurry containing 7% solids. The slurry was heated to about 93° C. (200° F.) where it was agitated for an additional 15–20 minutes. The hot slurry was then passed five times through an APV Gaulin two stage homogenizer operating at a pressure of about 563 kg/cm$^2$ (8000 psi). The final viscosity of the slurry was 12,000–18,000 cps measured using a Brookfield viscometer with a TB bar spindle at 10 rpm for 1 minute with the heliopath on. In a separate tank, 6 pounds of xanthan gum (Keltrol FXanthan gum-8.5% moisture content) was added to 71 gallons of deionized water to produce a 1% solids slurry. The slurry was agitated with a propeller mixer, and then it was passed through an in-line colloid mill. The xanthan gum slurry was then mixed, using the propeller mixer, with the microreticulated MCC slurry containing the 7% solids, as prepared above. The final slurry was 88% microreticulated microcrystalline cellulose and 12% xanthan gum as a 3.8% solid slurry, with a viscosity of 4300–4600 cps, as determined using the Brookfield viscometer described above. The slurry was then spray-dried using an 8 foot (2.4 meter) Bowen dryer, with an atomizing disk operating at 21,000 RPM. The operating inlet/outlet air temperature of the spray dryer was about 150–255° C. and 102–123° C., respectively. The yield of a mixture of 88% microreticulated MCC and 12% xanthan gum was 27 pounds in the form of a powder. The 27 pounds of powdered product was collected from the dryer, and reconstituted in water as a 4% concentrate. The mixture exhibited fully dispersed submicron crystalline cellulose particles after mixing under conditions simulating typical food processing. Under the same conditions of reconstitution, the viscosity of a 4.0% concentrate of dried powder in water was similar to that before the crystalline cellulose-xanthan gum agglomerate was spray-dried. The properties of the wet homogenized microreticulated form of the crystalline cellulose-xanthan gum mixture was thus retained in the spray drying and the reconstitution in water.

EXAMPLE 4

Preparation and Drying of Microreticulated Microcrystalline Cellulose Without the Addition of Xanthan Gum Hydrolyzed MCC wetcake, 1,315.8 grams (solid content 38%) was slurried in 5,827.1 grams of distilled water, as previously described in Example 1, giving a slurry containing 7% solids. The slurry was heated to about 71° C., where it was mixed for an additional 15 minutes. The hot MCC slurry was passed five times through a homogenizer as previously described in Example 1. A stable suspension of porous sub-micron crystalline cellulose was achieved after this treatment. The viscosity of the homogenized crystalline cellulose was 15,200 cps measured at 84° C. The mixture containing the 7% solids was then spray-dried under conditions previously described in Example 1. Upon reconstitution as a 7% solid mixture in water, the previously dried powder exhibited large crystalline cellulose aggregates which were strongly bonded. They would not disperse, even after extensive shearing using a high-speed blender. The reconstituted mixture did not develop a measurable viscosity. Upon standing for a few minutes, sedimentation of the large crystallites was apparent, thus showing the instability of the crystalline cellulose aggregates alone.

EXAMPLE 5

Preparation and Co-drying of a Mixture of 88% Microreticulated Microcrystalline Cellulose and 12% Sodium Carboxymethylcellulose (CMC) Gum Hydrolyzed MCC wetcake, 631.4 grams (solid content 38.8%) was slurried in 2868.6 grams of distilled water as it was being warmed to about 71° C. during a 30 minute period, giving a slurry of 7% solids. The slurry was homogenized as previously described in Example 1, by passing it about five times at a pressure of 563 kg/cm$^2$ through a homogenizer. The procedure was repeated a second time, giving a total for the two runs of about 7000 grams of microreticulated MCC. In a separate vessel, 16.3 grams (92% solids) of sodium CMC (7MF) was hydrated in 1483.7 grams of distilled water, giving a 1% (wt/wt) solution. A 1486.5 gram-aliquot of the microreticulated microcrstalline cellulose (which now contained 7.4% solids because of evaporation of some of the water in the solution) was then slurried with the 1% solution of sodium CMC. The mixture containing about 4.2% solids was spray-dried as previously described in Example 1, at an inlet/outlet air temperature of about 190° C. and 120° C., respectively. The completion of the spray-drying required about 4.0 minutes, yielding 51.4 grams of a mixture of 88% (wt/wt) microreticulated MCC and 12% sodium CMC in the form of a powder. Microscopic examination of the powder indicated that the majority of particles were very small in size.

A 13.2 gram sample of the 88/12 mixture of microreticulated MCC and sodium CMC (95.4% solids) was reconstituted in 286.8 grams of water, giving a slurry containing about 4.2% solids that was comparable in solid content to the original slurry before spray-drying. Observation of the reconstituted sample upon standing for 24 hours indicated that the slurry was stable at medium and high speed levels of dispersion. Microscopic analysis of the slurry indicated a stable system, with complete dispersion of the MCC. The viscosity of the reconstituted mixture was comparable to that before the MRC-CMC mixture was spray-dried. The properties of the wet homogenized microreticulated form of the crystalline cellulose-sodium CMC gum mixture was thus essentially retained in the spray drying and the reconstitution in water.

The resulting spray-dried powder, when mixed with other ingredients as prescribed for a salad dressing formulation forms the product shown below:

| No - Oil Salad Dressing | |
| --- | --- |
| Ingredients | Amount (wt/wt %) |
| Water | 89.90 |
| Vinegar (white distilled, 50 grain) | 5.00 |
| 88/12 Microreticuiated cellulose/ Sodium CMC gum | 2.00 |
| Starch | 3.00 |
| Xanthan gum | 0.15 |
| Salt | 2.00 |
| Dextrose | 5.50 |
| Flavors and Colorants | 1.45 |
| | 100.00 |

The no-oil salad dressing product prepared with the spray-dried 88/12 MRC-sodium CMC gum powder with 2.0% by weight of finished dressing has a fat-like rich texture and consistency similar to those obtained from pourable oil-based dressings.

EXAMPLE 6

Preparation and Co-drying of a Mixture of 85% Microreticulated Microcrystalline Cellulose and 15% Sodium Carboxymethylcellulose Gum A mixture of microreticulated MCC and sodium CMC was prepared and co-dried in a manner like to that of Example 5, using a 1435.8 gram aliquot of the microreticulated MCC (7.4% solids) and 1875.0 grams of 1% (wt/wt) sodium CMC (3.78% solids content of the slurry), yielding, when co-dried, 54.1 grams of a mixture of 85% microreticulated MCC and 15% sodium CMC in the form of a powder. Microscopic examination of the powder indicated that the majority of particles were of about 3–15 microns in size.

A 12.0 gram sample of the 85/15 agglomerate of microreticulated MCC and sodium CMC (94.8% solids) was reconstituted in 288.0 grams of distilled water which gave a slurry that was about 3.78% solids that was comparable in solid content to the original slurry before spray-drying.

The resulting spray-dried powder, when mixed with other ingredients as prescribed for a salad dressing formulation, forms the product shown below:

No - Oil Salad Dressing

| Ingredients | Amount (wt/wt %) |
|---|---|
| Water | 89.90 |
| Vinegar (white distilled, 50 grain) | 5.00 |
| 85/15 Microreticulated cellulose/ Sodium CMC gum | 2.00 |
| Starch | 3.00 |
| Xanthan gum | 0.15 |
| Salt | 2.00 |
| Dextrose | 5.50 |
| Flavors and Colorants | 1.45 |
| | 100.00 |

The no-oil salad dressing product prepared with the spray-dried 85:15 wt % MRC-sodium CMC gum powder with 2.0% by weight of finished dressing has a fat-like rich texture and consistency similar to those obtained from pourable oil-based dressings.

EXAMPLE 7

Preparation and Co-drying of a Mixture of 85% Microreticulated Microcrystalline Cellulose and 15% Sodium Caseinate A mixture of microreticulated MCC and sodium caseinate was prepared and co-dried in a manner similar to that of Example 1, using 6000.0 grams of homogenized MCC wetcake (7.4% solids), and 80.8 grams of sodium caseinate (3.0% moisture content) in 12280.6 grams of distilled water (a 4.00% solids mixture), yielding when co-dried, 200 grams of a mixture of 85% crystalline cellulose and 15% sodium caseinate in the form of a powder. The powder, 16 grams, was dispersed in 384 grams of distilled water (a 4.00% solids mixture), and mixed for 30 minutes with a medium speed mixer and then for 30 minutes with a high speed blender. When viewed under a microscope after mixing with the medium speed mixer, the 85/15 MCC/sodium caseinate was essentially a mixture of mostly rod-shaped particles with some large aggregates having an irregular configuration, and a few others having a somewhat spherical configuration. After shearing in the Waring blender for about 15 minutes, the particles showed no change in particle shape, and coalesced into a number of irregularly-sized large agglomerates. The mixture was not stable; sedimentation was apparent within minutes of standing. The resulting dispersion did not develop viscosity, and exhibited a two-phase separation when stored overnight.

Similar results were obtained when a mixture of 85/15 microreticulated MCC and konjac was tested.

We claim:

1. A composition comprising dry, water-dispersible particles, said particles consisting essentially of an agglomerate of components comprising microreticulated or microfibrillated microcrystalline cellulose in a predominant amount by weight, and a hydrocolloid selected from a the group consisting of carboxymethylcellulose and xanthan gum in an amount sufficient to provide effective coverage of the cellulose, which agglomerate readily disperses in water into its component parts under aqueous food-processing conditions.

2. The composition of claim 1 wherein the weight ratio of hydrocolloid to cellulose in the dry composition is from about 0.08–0.33:1.0.

3. The composition of claim 1 wherein the hydrocolloid is xanthan gum.

4. The composition of claim 1 wherein the hydrocolloid is a carboxymethylcellulose.

5. A composition comprising an aqueous medium having dispersed therein at least about 0.5 weight % of the composition of claim 1.

6. The composition of claim 5 wherein the hydrocolloid is xanthan gum.

7. The composition of claim 5 wherein the hydrocolloid is sodium carboxymethylcellulose.

8. A process for preparing the composition of claim 1 comprising forming an intimate mixture consisting essentially of microreticulated or microfibrillated microcrystalline cellulose and a hydrocolloid selected from the group consisting of xanthan gum and a carboxymethylcellulose in an aqueous medium under agitation spray-drying the resulting agglomerate, and recovering the composition of claim 1 in dry, particulate form.

9. The process of claim 8 wherein the hydrocolloid is xanthan gum.

10. The process of claim 8 wherein the hydrocolloid is sodium carboxymethylcellulose.

11. A food composition comprising a foodstuff having incorporated therein the composition of claim 1 in amounts sufficient to simulate the physical and organoleptic properties of fat.

12. A method of imparting fat-like properties to a low-calorie, aqueous based foodstuff which comprises intimately admixing the composition of claim 1 with a foodstuff in an aqueous medium, said composition being present in amounts sufficient to provide the foodstuff with fat-like characteristics.

13. The agglomerate of claim 1 wherein the weight ratio of the hydrocolloid to the cellulose is from about 0.14–0.18:1.

* * * * *